INVENTOR.
FRANK S. NANNA

April 4, 1967 F. S. NANNA 3,312,161
APPARATUS FOR GRILLING FOOD
Filed Nov. 6, 1963 2 Sheets-Sheet 2
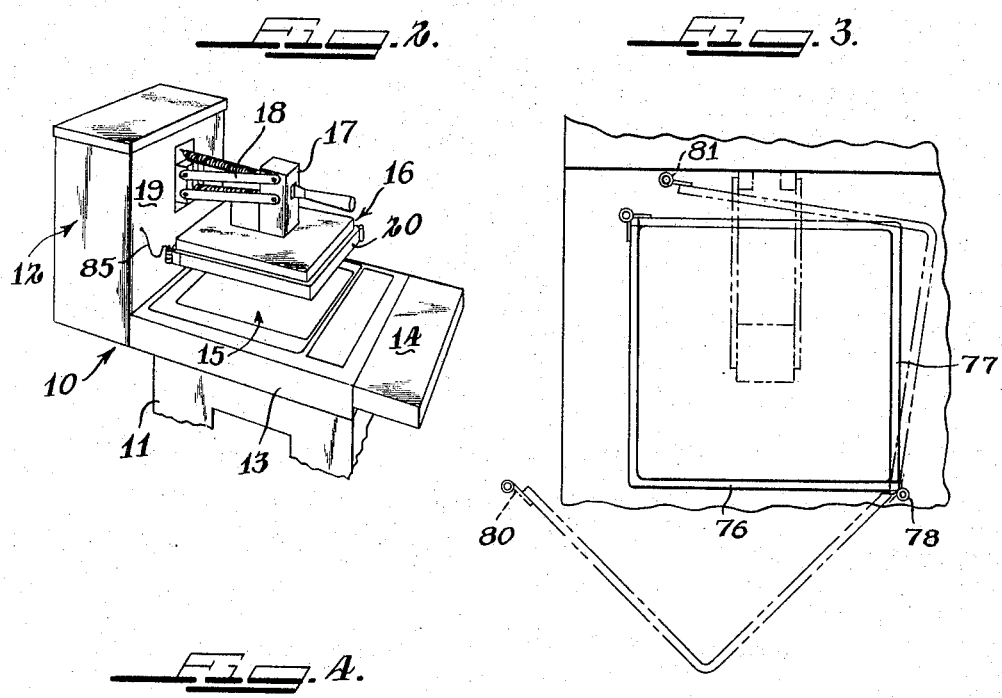
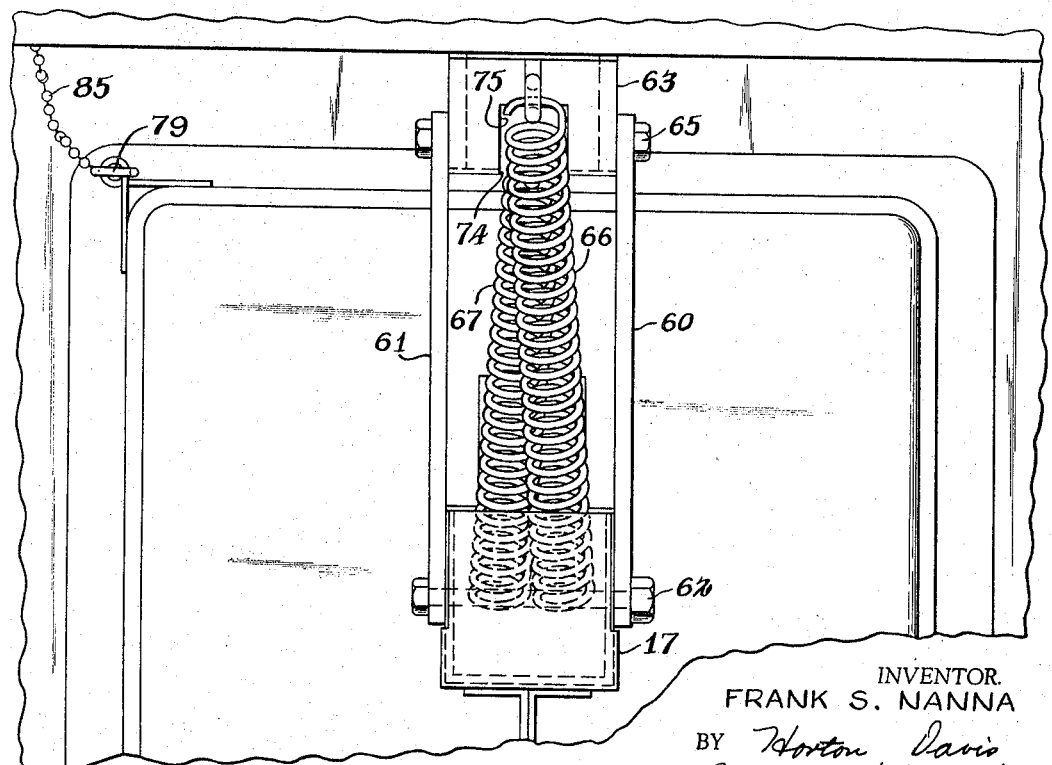
INVENTOR.
FRANK S. NANNA
BY Horton, Davis,
Brewer and Bragman
Attys

United States Patent Office 3,312,161
Patented Apr. 4, 1967

3,312,161
APPARATUS FOR GRILLING FOOD
Frank S. Nanna, 2825 Malabar Ave.,
Santa Clara, Calif. 95051
Filed Nov. 6, 1963, Ser. No. 321,839
1 Claim. (Cl. 99—377)

This invention relates to apparatus for cooking food and particularly to apparatus for grilling food such as hamburgers or the like.

In my Patent No. 2,575,068 for Automatic Food Forming and Cooking Machine dated Nov. 13, 1951, I disclose and claim a machine which uses hot oil as the heating medium for cooking food. The oil is heated by an electric heating unit immersed therein and the oil is circulated over the electric heating unit through natural convection. The use of a hot liquid medium insures uniform heat throughout the grill on which the food is placed, thereby avoiding localized hot spots which burn the food. In my aforesaid prior patent, however, the heating unit is located at some distance from the surface of the grill on which the food is located, which reduces the efficiency of the unit in that the convection currents set up tend to become localized in the area of the heating unit and therefore deprive the cooking area of the quick heat recovery required for continuous use.

It is therefore an object of this invention to provide a food cooking apparatus using hot oil as a heating medium in which the relationship of the heating surface in contact with the food, the oil for heating the surfaces, and the electric heating unit is improved to the end that the presence of hot oil at the heating surface and quick heat recovery of the oil from the effect of cold food placed upon the heating surface will be greatly enhanced.

In cooking ground meat it is desirable to cook both surfaces of the meat at the same time to reduce the waiting time for the completion of the cooking operation. It is therefore another object of this invention to provide a cooking apparatus having an upper grill and a lower grill, both grills being heated with oil and both grills having electrical heating units for the oil, wherein greater efficiency in the heating of the oil is obtained in both grills.

Other objects of this invention include the provision of a table-type food grilling apparatus having a spring balanced upper grill to reduce the effort required to raise or lower the grill relative to the lower grill; the provision of a novel tray and grease disposal container; and the provision of a readily cleanable guard which automatically adjusts itself to the space between the grills to prevent grease from spattering out from between said grills.

These and other objects of this invention will become apparent from the following detailed description when taken together with the accompanying drawings in which FIG. 1 is a side elevational view in section of a grill incorporating the features of this invention;

FIG. 2 is a perspective view on a reduced scale of the grill of FIG. 1;

FIG. 3 is a plan view of the guard used between the grills; and

FIG. 4 is a fragmentary plan view of the spring balance means for reducing the effort required to raise and lower the upper grill.

Figure 1:
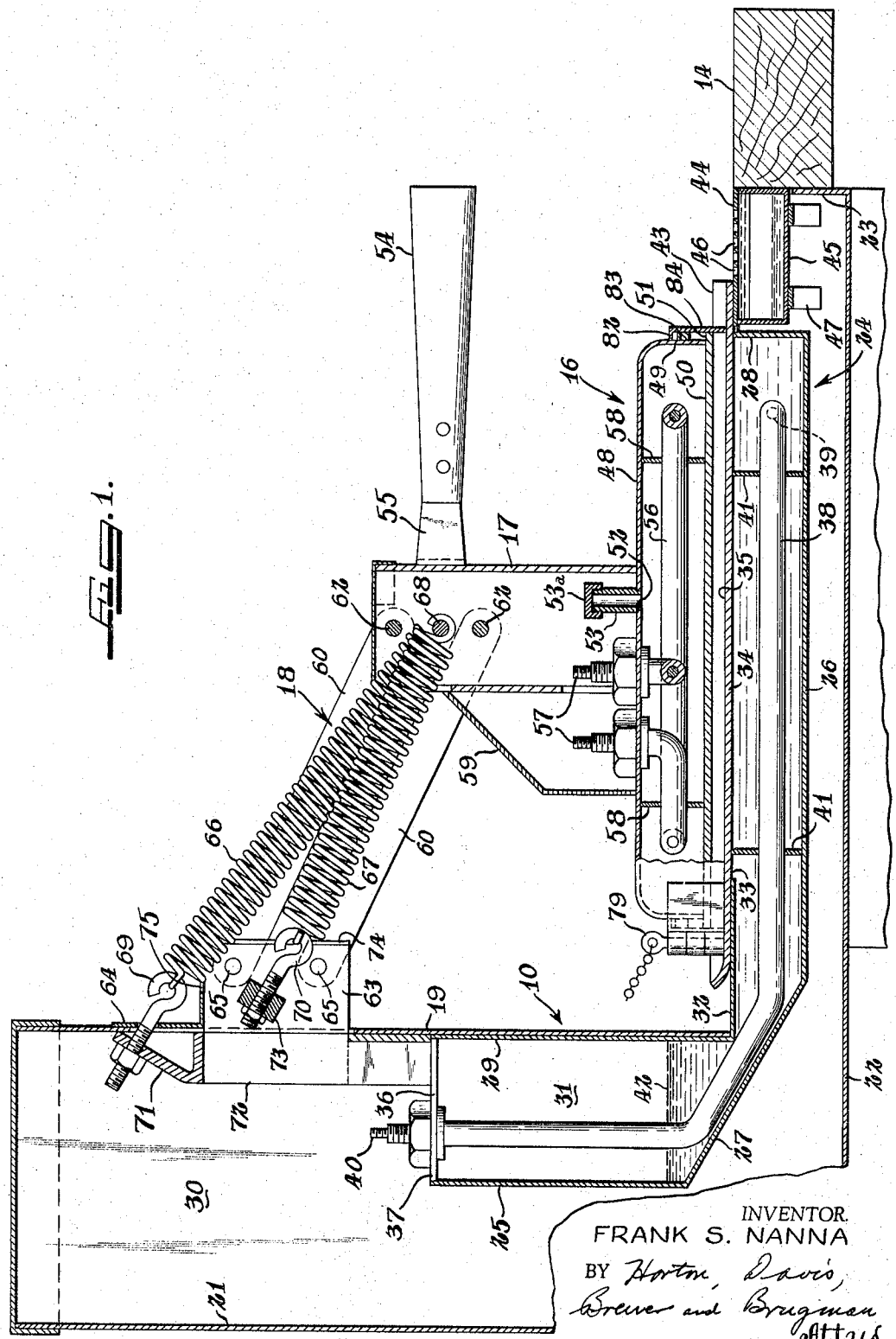

Referring now to the drawings for a description of the preferred embodiment disclosed therein, and particularly to FIG. 2 for a general description of its principal parts, the apparatus of this invention is comprised of a cabinet 10 made of stainless steel or other metal approved for use with food handling apparatus. Cabinet 10 may be conveniently mounted on a suitable stand or table 11. Cabinet 10 is comprised of a vertical back portion 12 and an adjacent horizontally disposed section 13. If desired, a short counter 14, made of wood or other material, on which food can be cut, may be placed next to or attached to the front wall of horizontal section 13. The meat to be cooked may be placed or held on counter 14 prior to its insertion into the cooking apparatus. Similarly, sandwiches incorporating the cooked food may be assembled, cut and placed on plates on counter 14.

On horizontal section 13 is located a lower grill 15 which, in the form chosen to illustrate this invention, may be of square form for ease of construction as well as for maximum capacity of cooked meat per unit time. Immediately above lower grill 15 is the upper grill 16 which is also of square form to match lower grill 15. Said upper grill 16 is formed with a central post 17, which is supported by a parallelogram linkage 18 from the front wall 19 of the vertical back portion 12. A grease guard 20 is carried on upper grill 16 and is adapted to rest upon lower grill 15 during the cooking operation to prevent hot grease and the like from spattering and injuring the operator of the apparatus.

Referring now to FIG. 1 for a detailed description of the apparatus, the vertical back portion and the horizontally disposed section of cabinet 10 may be formed as a single unit including a back wall 21, a bottom wall 22, the aforementioned front wall 19 of the vertical back portion, and a low front wall 23 of the horizontal section 13. This leaves the top of the horizontal section 13 open for the reception of the lower heating unit shown generally at 24. Said lower heating unit 24 is comprised of a closed container having a back wall 25, a bottom wall 26 connected through a sloping wall 27 with back wall 25, a front wall 28 extending upwardly from the front edge of bottom wall 26, and an L-shaped wall 29 spaced from back wall 25, one portion of wall 29 being substantially parallel with said back wall. The ends of cabinet 10 are closed by appropriately shaped walls 30. Inner container 24, however, may have separate end walls 31 to isolate the interior of said lower heating unit 24 from the remainder of cabinet 10.

L-shaped wall 29 has a short horizontal section 32 which terminates some distance rearwardly of front wall 28 so as to define an opening 33 therewith and with end walls 31. Said opening 33 is closed by a plate 34 of heavier gauge than the remainder of lower heating unit 24, which provides the heating or grill surface 35 on which the meat to be cooked is placed. Plate 34 is united to the various sections and walls by welding or otherwise to form a fluid-tight seal therewith. The top 36 of the lower heating unit 24 may comprise a closure plate which has an opening 37 therein of suitable proportions to permit pouring oil into said heating unit 24 to be used as the heating medium for plate 34.

The heating element for lower heating unit 24 is an electric resistance unit of known type and generally referred to as a Calrod element. Said heating element is shown at 38 and is comprised of a tube within which, and insulated therefrom, is a resistance rod 39 which has external terminals for connection to a source of electrical energy, one of which is shown at 40. Said element is bent into a form suitable to provide the length of heating element per unit of area of heating surface required to supply the heating capacity desired. It may be appreciated that the meat in its uncooked form is refrigerated and is therefore at near freezing temperature. The application of this cold meat to the surface 35 results in an extraction of heat from the plate 34 which must be replaced by the heating element. If rapid cooking of the meat is desired, then a rapid recovery rate is necessary in the heating unit 24 and this, in turn, dictates the length of the element to be inserted under plate 34.

It may be observed that the heating element 38 in the present invention is disposed under plate 34 rather than to one side of said plate as in my aforesaid patent. Thus convection currents are readily set up which transfer the oil from the cooled plate 34 downward past the heating element 37 to be heated thereby and then back upward to the said plate 34. The total path traveled by the oil is thus quite short and the efficiency with which heat is transferred from heating element 38 to plate 34 is correspondingly high. In this manner I am able to gain the uniformity of heat distribution over plate 34, which is inherent in the use of a liquid heating medium, as well as the efficiency of a heating element located in close proximity to the surface to be heated.

Although heating element 38 is quite stiff, it may nevertheless be desirable to support said unit a uniform distance from plate 34, and to this end, element 38 may be threaded, prior to its assembly in heating unit 24, through washers 41 of appropriate diameter resting upon bottom wall 26 and disposed transversely of element 38 so as to form a support therefor from bottom wall 26.

To insure maximum efficiency of heat transfer from heating element 38 to plate 34, it is necessary to have heating unit 24 filled with oil at least up to the level of plate 34. However, oil expands approximately one-third its volume when its temperature is raised from room temperature to 440° F., the desired cooking temperature, and hence, should unit 24 be filled with cold oil up to the level of plate 34 and slightly above as a margin of safety, the oil, when heated to cooking temperature, would expand and the volume would be much greater than was necessary. Accordingly, unit 24 is filled with cold oil to a level below plate 34, the level being determined by trial and error to fill unit 24 to the level 42 when the oil is heated to 470° F. This temperature is higher than necessary, but it provides a margin of safety to make certain that the hot oil will not overflow its container. The exact volume of oil so determined can be noted for future refilling of unit 24.

The back and sides of plate 34 are curved upwardly to form a retaining ledge 43, which assists in keeping grease and juices from flowing backward and sideward off plate 34. The front edge of said plate, however, is flat and overlies the top 44 of a container 45 into which such greases and juices may flow through appropriate perforations 46 formed in said top 44. It is contemplated that container 45 will be removable to permit it to be drained, and to this end it is designed to rest upon brackets 47 formed in end walls 31.

Upper grill 16 is comprised of an inverted square, relatively shallow container made of stainless steel or the like and having a top wall 48 and side walls 49 depending therefrom. A plate 50, which may be made of substantially the same material as plate 34, extends across the ends of side walls 49 and for a short distance beyond to form a horizontally extending flange 51 running around all four sides of the unit. An opening 52 is formed in top wall 48 and a short pipe 53 is secured to wall 48 over opening 52 to provide a fill pipe for the upper grill. Post 17 is secured to top wall 48 around pipe 53. A handle 54 is secured to a bracket 55 on post 17 and serves as the means by which upper grill 16 may be raised and lowered with respect to lower grill 15.

Within upper grill 16 is an electric heating element 56, preferably made of the same material as heating element 38 in lower grill 15, and which is similarly formed to give the requisite heating capacity for the oil retained in the upper grill 16. Heating element 56 has external terminals 57 for connection to a suitable source of electricity. Said heating element 56 is supported in spaced relation to plate 50 by washers 58 threaded over the heating element and resting upon plate 50. A cover plate 59 may be employed to conceal terminals 57 and their connection to a flexible cable (not shown) supplying the electrical energy thereto.

A cap 53a may be threaded over the end of pipe 53 to seal the oil in the upper grill 16. This prevents loss of oil due to evaporation. The quantity of oil in the upper grill is predetermined to leave an air space above the oil when the oil is at cooking temperature. This space is preferably made to be at atmospheric pressure during cooking by filling the grill with oil when the grill is cold, heating the grill to approximately twenty degrees above normal cooking temperature to cause the grill to be filled with expanded oil, then allowing the oil to cool to cooking temperature and closing pipe 53 with cap 53a. When the grill cools to room temperature, the volume of oil will be reduced and the upper grill will then be under vacuum. The same arrangement may, of course, be used in connection with lower grill 24 to avoid loss of oil through evaporation. Because of the movable nature of the upper grill, it is also desirable, from the standpoint of safety, to seal the oil therein as provided by cap 53a.

Referring now to FIGS. 1 and 4, the parallelogram linkage 18 is comprised of two pairs of identical links 60 and 61 disposed one pair on either side of post 17 and pivotally mounted thereon through the intermediary of bolts 62 passing through appropriate openings in the ends of links 60 and 61 and in post 17. The opposite ends of links 60 and 61 are similarly pivotally mounted on a lug 63 formed from sheet metal and secured by spot welding a tongue 64 thereon to front wall 19 of back portion 12. The pivotal mounting for said opposite ends of the links is comprised of bolts 65 which pass through the lug and are of substantially the same size and character as bolt 62.

The weight of upper grill 16 and links 60 and 61 is counter-balanced to a large extent by a pair of springs 66 and 67 connected at their lower ends to a transverse pin 68 passing through post 17 substantially midway between the bolts 62 on which links 60 and 61 are pivoted. At their opposite ends springs 66 and 67 are connected to eyebolts 69 and 70, respectively. Eye bolt 69 is threadedly received in an inclined portion 71 of a heavy stamping 72 appropriately secured by welding or the like to front wall 19. Eye bolt 70 is threadedly received in a bar 73 secured by welding or the like to opposite sides of lug stamping 63. It is contemplated that the force exerted by springs 66 and 67 may be adjusted by adjusting the position of eye bolts 69 and 70 in their respective supports 71 and 73. The stamped lug 63 has appropriate openings in its front and top walls as shown at 74 and 75 to allow springs 66 and 67 to pass through said lug when necessary.

Guard ring 20 is shown in FIG. 3 as being comprised of two parts 76 and 77 of angular form hinged together at 78 and removably held together at their opposite ends by a pin 79 passing through pintles 80 and 81 on parts 76 and 77, respectively. Each part 76 and 77 in cross section (FIG. 1) has a horizontal flange 82 overlying a bead 83 welded or otherwise secured to the side walls 49 of upper grille 16. The vertical portion 84 of each part 76 and 77 embraces the flange 51 formed by the extending edges of the plate 50 on upper grill 16. Said parts 76 and 77 are free to move vertically relative to bead 83, but upon grill 16 being raised a sufficient distance above lower grill 15, parts 76 and 77 drop until the horizontal part 82 thereof rests upon, and guard ring 20 is supported by, bead 83.

Guard 20 may be readily removed from upper grill 16 by removing pin 79 from pintles 80 and 81 to allow parts 76 and 77 to swing apart on hinge 78 as shown in dotted lines in FIG. 3. Loss of pin 79 may be prevented by attaching it to a chain 85 which is appropriately secured to the front wall 19 of the cabinet.

Although in upper grill 16 the plate 50 to be heated is below the heating element 56 so that convection currents are set up normally in a direction away from said plate 50, the quantity of oil in upper grill 16 is relatively small and the spacing between heating element 56 and plate 50 is likewise small, so that an efficient transfer of heat may be effected from heating element 56 to plate 50 while at the same time retaining the uniformity of heat distribution characteristic of a fluid heating medium.

The oil used as the heating medium may be any oil which can safely be heated to a temperature of approximately 440° F. for long periods of time without breaking down into carbon and volatile constituents. Certain of the silicone oils have been found to be satisfactory for this use. I have found, for example, that with a single unit of the type described above it is possible to broil five hamburger patties in approximately 20 seconds, which gives a production of 900 per hour per unit. The consumption of electricity for such production is 6 kilowatt hours. Obviously, the production from the apparatus can be doubled, trebled, etc. by increasing the number of grill units per cabinet.

Minor variations in the design and proportions of the grills can be made without departing from the spirit of this invention. Limitations in the physical properties of the heating fluid may dictate larger reservoirs or quantities of such oil to be used in each grill to avoid excessive heating of the fluid to compensate for rapid extraction of heat from the grills by the food being cooked. The lengths of the links 60 and 61 may likewise be varied to provide a greater degree of separation between the grills to facilitate the removal of cooked meat therefrom and the insertion of uncooked meat thereinto.

It is understood that electrical heating units 38 and 56 will be controlled by conventional thermostats immersed in the oil adjacent plates 34 and 50 and which are adjustable to provide any desired cooking temperature in said plates.

The heating elements may take other forms including plates which are cast around the Calrod resistance rods, said plates being immersed in the oil, or alternatively, forming a wall of the container. In all forms, however, the heating element is preferably in planar form uniformly spaced from the food contacting plates so that heat from said elements is transferred to the oil and then distributed by the oil to the said plates.

It is understood furthermore that the foregoing description is merely illustrative of a preferred embodiment of this invention and that the scope of the invention therefore is not to be limited thereto, but is to be determined by the appended claim.

I claim:

Apparatus for cooking food at elevated temperatures comprising a cabinet, including a cooking assembly having a horizontal section and a vertical section disposed at one end of the horizontal section, a lower container having connected horizontal and vertical chambers with said vertical chamber located in said vertical section, a cooking plate on the upper horizontal wall of the horizontal chamber of said lower container, electric heating means in said horizontal chamber on said lower container and disposed below and close to said cooking plate, oil in said lower container immersing said electric heating means to be heated thereby, said oil filling the region of said horizontal chamber of said lower container between said heating means and said first cooking plate and extending partially into the vertical chamber of said lower container to expand thereinto, an upper container, said upper container movably disposed above said cooking plate and having the bottom wall thereof defined by a second cooking plate, second electric heating means in said upper container, oil in said upper container substantially immersing said second electric heating means in the said upper container and heated thereby, and means for supporting said upper container from the vertical section of said cabinet for moving said upper container from a position in which said first and second cooking plates are spaced apart for insertion of food to be cooked therebetween and to a position wherein said first and second plates contact opposite surfaces of the food positioned therebetween.

References Cited by the Examiner

UNITED STATES PATENTS

| 1,795,710 | 3/1931 | Clark | 99—379 |
| 1,839,112 | 12/1931 | Mills | 99—379 |
| 2,009,791 | 7/1935 | Shroyer | 99—377 |
| 2,039,218 | 4/1936 | Govoroff | 99—379 |
| 2,575,068 | 11/1951 | Nanna | 99—353 |
| 2,632,379 | 3/1953 | Kudo | 99—375 |
| 2,744,519 | 5/1956 | Means | 126—299 |
| 2,770,182 | 11/1956 | Jensen | 99—379 |
| 2,836,171 | 5/1958 | Cripe | 126—214 |
| 3,064,555 | 11/1962 | Nanna | 99—353 |
| 3,066,430 | 12/1962 | Kannegiesser et al. | 38—17 X |
| 3,068,778 | 12/1962 | Majerus | 99—375 |

CHARLES A. WILLMUTH, *Primary Examiner.*

ROBERT E. PULFREY, *Examiner.*

LAWRENCE CHARLES, WILLIAM A. VANSANTEN, STANLEY BECK, *Assistant Examiners.*